(12) United States Patent
Yamazoe et al.

(10) Patent No.: US 11,307,391 B2
(45) Date of Patent: Apr. 19, 2022

(54) IMAGING LENS AND IMAGING DEVICE (71) Applicant: TAMRON CO., LTD., Saitama (JP)

(72) Inventors: Junichi Yamazoe, Saitama (JP); Koutarou Joujiki, Saitama (JP)

(73) Assignee: TAMRON CO., LTD., Saitama (JP)

( * ) Notice: Subject to any disclaimer, the term of this patent is extended or adjusted under 35 U.S.C. 154(b) by 84 days.

(21) Appl. No.: 16/687,989

(22) Filed: Nov. 19, 2019

(65) Prior Publication Data
US 2020/0341247 A1 Oct. 29, 2020

(30) Foreign Application Priority Data

Apr. 23, 2019 (JP) .............................. JP2019-081807

(51) Int. Cl.
*G02B 15/14* (2006.01)
*G02B 9/12* (2006.01)
*H04N 5/225* (2006.01)

(52) U.S. Cl.
CPC ....... *G02B 15/143103* (2019.08); *G02B 9/12* (2013.01); *H04N 5/2254* (2013.01)

(58) Field of Classification Search
CPC .......................... G02B 15/143103; G02B 9/12
See application file for complete search history.

(56) References Cited

U.S. PATENT DOCUMENTS

| 6,188,522 B1* | 2/2001 | Kimura ................. G02B 13/16 359/643 |
| 2012/0212842 A1* | 8/2012 | Hosoi ...................... G02B 9/12 359/784 |
| 2017/0157519 A1 | 6/2017 | Nishiyama et al. |
| 2021/0231928 A1* | 7/2021 | Sashima ................ G02B 13/00 |

FOREIGN PATENT DOCUMENTS

| EP | 3 015 897 A1 | 5/2016 |
| JP | 2014-235176 A | 12/2014 |
| JP | 2016-16146 A | 2/2016 |
| JP | 2016-90725 A | 5/2016 |

OTHER PUBLICATIONS

Yang et al. "Design of apochromatic telescope without anomalous dispersion glasses" Feb. 10, 2008, Chinese Optics Letters, vol. 6 No. 2, pp. 146-148 (Year: 2008).*
Gross et al. "Handbook of Optical Systems", 2007, Wiley-VCH Verlag GmbH & Co. KGaA, "Volume 3: Aberration Theory and Correction of Optical Systems", pp. 377-379 (Year: 2007).*

* cited by examiner

*Primary Examiner* — Cara E Rakowski
(74) *Attorney, Agent, or Firm* — WHDA, LLP (57) ABSTRACT

An imaging lens and an imaging device furnished with same, including a first lens group having a positive refractive power, a second lens group having a positive refractive power, and a third lens group having a negative refractive power, disposed in sequence from the object side, wherein zooming from a point at infinity to an object at the near point is performed by moving the second lens group along an optical axis toward the object side while affixing the first lens group and third lens group, and satisfying predetermined conditional expressions.

7 Claims, 11 Drawing Sheets

IMAGING LENS AND IMAGING DEVICE

FIELD OF THE INVENTION

The present invention pertains to an imaging lens and an imaging device. More particularly, the present invention pertains to an imaging lens and an imaging device of the internal focus type, which is compact and offers superior optical performance.

BACKGROUND ART

In recent years, due to the desire for higher picture quality in digital cameras, as mirrorless cameras with larger image capture elements or flange focal distance become more common, there is increasing call for smaller sized imaging lenses with higher optical performance.

There is also the issue that, once the above-described wishes are met, internal focus-type lenses are preferable. In other words, internal focus-type lenses are well suited for focusing lenses with reduced apertures weight, enabling improved focus speeds and focus accuracies. Internal focus-type lenses also have the major advantages that, because of their smaller apertures and reduced weight, their center of gravity barely moves during a focusing operation, and because the lens barrel mechanical length does not change, operability is good during image capture.

One prior art for such internal focus-type lenses has included optical systems in which a first lens group, fixed relative to the imaging plane and having a positive refractive power, and a focusing lens group (second lens group) having a strong positive refractive power are disposed in sequence from the object side, such that by reducing the amount of movement of the focusing lens group when focusing, the total optical length, i.e., the distance from an object face to the focal plane in the first lens group, is shortened (e.g., see Patent Document 1).

Other prior art for the above-described internal focus-type lens includes those in which a fixed first lens group having a positive refractive power relative to the imaging plane, and a focusing lens group (second lens group) having a strong positive refractive power are disposed in sequence from the object side, and a third lens group having a negative refracting power is also disposed on the image side of the focusing lens group (e.g., see Patent Documents 2 and 3). These internal focus-type lenses have a telephoto arrangement, in which a group with positive refractive power is disposed on the object side, and a group with negative refractive power is disposed on the imaging plane side, enabling even further compactification of the lenses.

LIST OF DOCUMENTS OF THE RELATED ART

Patent Documents

Patent Document 1: JP-A-2016-16146
Patent Document 2: JP-A-2014-235176
Patent Document 3: JP-A-2016-90725.

In the above-described prior art, the refractive power of the third lens group is positive in the internal focus-type lens proposed in Patent Document 1, and a telephoto configuration is not adopted, so reduction of the optical system size is insufficient.

In the internal focus-type lens disclosed in Patent Document 2, the ratio of the first lens group to the total length of the entire optics is large, and size reduction is insufficient.

In the internal focus-type lens proposed in Patent Document 3, the refractive power of the second lens group, which is the focus lens, is weak, and since the amount of movement of the second lens group is large when focusing, size reduction of the overall optics is insufficient.

SUMMARY OF THE INVENTION

The present invention was undertaken in light of the above-described problems with internal focus-type lenses, and has the primary objective of providing an imaging lens and an imaging device compact in size with superior optical performance.

To resolve the problems above, the imaging lens according to one aspect of the invention comprises a first lens group having a positive refractive power a second lens group having a positive refractive power and a third lens group having a negative refractive power, disposed in sequence from the object side, wherein focusing from a point at infinity to an object at the near point is performed by moving the second lens group along the optical axis toward the object side while fixing the first lens group and third lens group fixed, thereby satisfying the following conditional expressions $$3.0 \le (1-b2^2) \times b3^2 \le 10.0 \quad (1)$$

$$0.10 \le L1/TL \le 0.30 \quad (2)$$

whereby:
b2: lateral magnification of the second lens group at a point at infinity
b3: lateral magnification of the third lens group at a point at infinity
L1: total length of the first lens group
TL: total optical length of the imaging lens.

An imaging device according to an aspect of the invention comprises an imaging lens and an imaging element, disposed at the imaging position of the imaging lens, for converting the optical image formed by the imaging lens into an electrical signal.

The present invention enables the constitution of an internal focus-type imaging lens and imaging device compact in size and with superior optical performance.

SUMMARY OF THE INVENTION

The imaging lens according to an embodiment of the invention comprises a first lens group having a positive refractive power, a second lens group having a positive refractive power, and a third lens group having a negative refractive power, disposed in sequence from the object side, wherein focusing from a point at infinity to an object at the near point is performed by moving the second lens group along the optical axis toward the object side while fixing the first lens group and third lens group.

In the invention thus constituted, an effective telephoto configuration is achieved by imparting a convergence action by a first lens group with positive refractive power and a second lens group with positive refractive power, and a divergence action by a third lens group with negative refractive power, so that greater telephoto ratio can be achieved while avoiding an increase in the size of the imaging lens.

Also, in the present invention an "internal focus-type" focusing method is adopted, whereby focusing from a point in infinity to an object at the near point is accomplished by moving the second lens group along the optical axis toward the object side while fixing the first lens group and third lens group. Using a compact and lightweight focusing lens of this internal focus type enables high speed focusing, facilitates creation of an airtight lens barrel structure without changing overall optical length when focusing, and enables effective prevention of dust or debris penetration into the lens barrel from gaps in the lens barrel.

An imaging lens according to an embodiment of the invention preferably satisfies conditional equation (1) below $$3.0 \leq (1-b2^2) \times b3^3 \leq 10.0 \quad (1)$$

whereby:
b2: lateral magnification of the second lens group focused at a point at infinity
b3: lateral magnification of the third lens group focused at a point at infinity.

Conditional equation (1) shows a value pertaining to the focusing sensitivity, i.e., the ratio of the amount of movement of the imaging plane relative to the amount of movement of the second lens group, which is the focusing lens, in the direction of the optical axis. By satisfying conditional expression (1), the imaging lens can be made compact.

Since the power of the second lens group is weakened when this value drops below a lower limit, the amount of movement of the second lens group has to be increased when focusing at a point in infinity to an object at the near point. Therefore total optical length increases due to the increase in the amount of movement of the second lens group, which is undesirable from the standpoint of reducing image capturing lens size.

When this numerical value exceeds an upper limit, the power of the second lens group increases, so a large number of lenses for correcting aberration are required to maintain high imaging performance. The total optical length increases due to the increase in number of lenses, which is undesirable from the standpoint of reducing imaging lens size.

The lower limit of conditional equation (1) is preferably 3.1 and more preferably 3.2. The upper limit of conditional equation (1) is preferably 9.0 and more preferably 8.0.

An imaging lens according to an embodiment of the invention preferably satisfies conditional equation (2) below $$0.10 \leq L1/TL \leq 0.30 \quad (2)$$

whereby

L1: total length of the first lens group
TL: total optical length of the imaging lens.

Conditional equation (2) indicates the ratio of the total length of the first lens group (the distance from the side closest to object to the side closest to image) relative to the total optical length of the image capturing lens. Satisfying conditional equation (2) enables smaller size and good aberration correction.

When this numerical value is below a lower limit, the number of lenses constituting the first lens group is limited, making it difficult to correct aberration and maintain high imaging performance.

When this numerical value exceeds an upper limit, the total length of the first lens group is lengthened, and the total optical length of the image capturing lens also lengthens, making this undesirable from the standpoint of decreasing the size of the imaging lens.

The lower limit of conditional equation (2) is preferably 0.11 and more preferably 0.115. The upper limit of conditional equation (2) is preferably 0.28 and more preferably 0.27.

In an imaging lens according to an embodiment of the invention, the interval between the first lens group and second lens group when focused at a point at infinity is preferably smaller than the total length of the first lens group. With this constitution, the lens group spacing is appropriate, and the size of the imaging lens can be reduced.

An imaging lens according to an embodiment of the invention preferably satisfies conditional equation (3) below $$0.10 \leq f2/f1 \leq 0.50 \quad (3)$$

whereby
f1: focal length of the first lens group
f2: focal length of the second lens group.

Conditional equation (3) shows the ratio of the second lens group focal length to the first lens group focal length. Satisfying conditional equation (3) enables a reduction in size and favorable aberration correction.

When this numerical value falls below a lower limit, the power of the second lens group increases, therefore to maintain high imaging performance requires a large number of lenses to correct for aberration. In such cases the total optical length increases due to the increase in number of lenses, which is undesirable from the standpoint of reducing imaging lens size.

When this numerical value is exceeded, the power of the second lens group is weakened, and the amount of movement by the second lens group increases when focusing at a point in infinity to an object at the near point. Therefore the total optical length increases due to the increase in the amount of movement of the second lens group, which is undesirable from the standpoint of reducing imaging lens size.

The lower limit of conditional equation (3) is preferably 0.11 and more preferably 0.115. The upper limit of conditional equation (3) is preferably 0.40 and more preferably 0.35.

An imaging lens according to an embodiment of the invention preferably satisfies conditional equation (4) below $$0.8 \leq f3|/f12 \leq 2.2 \quad (4)$$

whereby:
f12: combined first lens group and second lens group focal length when focused at a point at infinity.
f3: third lens group focal length.

Conditional equation (4) shows that the ratio of the third lens group focal length to the combined first lens group and second lens group focal length when focused at a point at infinity can be reduced by satisfying conditional equation (4).

When this numerical value falls below a lower limit, the power of the third lens group increases, therefore to maintain high imaging performance requires a large number of lenses to correct for aberration. An increased number of lenses leads to greater optical length, which is undesirable from the standpoint of reducing imaging lens size.

When this numerical value is exceeded, the power of the third lens group is weakened, and the telephoto ratio is decreased so that total optical length increases, which is undesirable from the standpoint of reducing image capturing lens size.

The lower limit of conditional equation (4) is preferably 0.9 and more preferably 0.95. The upper limit of conditional equation (4) is preferably 2.0 and more preferably 1.9.

An imaging lens according to an embodiment of the invention preferably satisfies conditional equation (5) below $$0.50 \leq TL/FL \leq 1.20 \quad (5)$$

whereby:

FL: focal length of the imaging lens when focused at a point at infinity.

Conditional equation (5) indicates what is known as the telephoto ratio: the ratio of the total optical length (air-equivalent length, not including dummy glass, etc.) to the focal distance of the imaging lens when focused at a point at infinity. Satisfying conditional equation (5) enables both smaller size and good aberration correction.

If this numerical value falls below a lower limit, the total optical length becomes too short relative to the imaging lens focal length, and correction of spherical aberration or axial chromatic aberration becomes difficult. In addition, the amount of aberration relative to assembly tolerances, i.e., assembly tolerance sensitivity, becomes too high, leading to a requirement for high precision assembly and high component precision, which is undesirable.

When the numerical value exceeds this upper limit, total optical length relative to the imaging lens focal length increases, which is undesirable from the standpoint of reducing image capturing lens size.

The lower limit of conditional equation (5) is preferably 0.65 and more preferably 0.80.

The upper limit of conditional equation (5) is preferably 1.18 and more preferably 1.16.

An imaging lens according to an embodiment of the invention preferably satisfies conditional equation (6) below $$2.0 \leq FL/Y \leq 10.0 \quad (6)$$

whereby:

FL: focal length of the imaging lens when focused at a point at infinity

Y: maximum image height.

Conditional equation (6) indicates the ratio of the imaging lens focal length when focused at a point at infinity to the maximum image height. By satisfying conditional equation (6), a smaller size and an appropriate angle of view can be obtained.

If this numerical value falls below a lower limit, the imaging lens focal length is shortened, requiring aberration correction over a wide angle of view and making a telephoto configuration difficult. To achieve aberration correction over a wide angle of view while maintaining flange focal distance requires adoption of a retro-focus type of configuration, in which a negative refracting lens group is disposed on the object side, and a positive refracting lens is disposed on the imaging plane side. When a retro-focus type of configuration is adopted, total optical length relative to focal length increases, which is undesirable from the standpoint of reducing image capturing lens size.

When this numerical value exceeds an upper limit, the focal length increases, and the total optical length correspondingly increases. This is therefore undesirable from the standpoint of reducing image capturing lens size. The lower limit of conditional equation (6) is preferably 3.0 and more preferably 3.5.

The conditional equation (6) upper limit is preferably 8.5 and more preferably 7.0.

It is preferable in the imaging lens of an embodiment of the invention for the total number of lenses in the first lens group, the second lens group, and the third lens group to be 10 or less.

When the number of lenses exceeds this number, the total optical length increases so as to dispose the many lenses, which is undesirable from the standpoint of reducing image capturing lens size.

The total number of lenses is preferably between 7 and 10, inclusive. Adopting a number of lenses in this range allows for both higher performance and reduced size.

For imaging lenses according to an embodiment of the invention, it is preferable for the first lens group to have at least one lens with positive refractive power, whereby the positive lens satisfies the following conditional equation (7).

$$0.012 \leq \Delta PgF1 \leq 0.100 \quad (7)$$

whereby:

$\Delta PgF1$: deviation of a partial dispersion ratio of the positive lens from a reference line, the reference line being a straight line passing coordinates of partial dispersion ratio values and vd values of C7, which have a partial dispersion ration of 0.5393 and vd of 60.49 and F2, which have a partial dispersion ratio of 0.5829 and vd of 36.30.

Conditional equation (7) is an expression for defining the abnormal dispersiveness of lenses with positive refractive power in the first lens group. By satisfying conditional equation (7), positive lenses with high abnormal dispersion can be used in the first lens group. Note also that when multiple positive lenses are included in the first lens group, it is sufficient for any one of the positive lenses to satisfy conditional equation (7).

As a general chromatic aberration correction method, in a lens group with a positive refractive power a high dispersion glass is used as a lens with a negative refractive power, and a low dispersion glass is used as a lens with a positive refractive power. However in orthogonal coordinates where the refraction index is taken from the vertical axis and wavelength is taken from the horizontal axis, the dispersion characteristics of high dispersion glass are quadratic, while the dispersion characteristics of low dispersion glass are linear. Therefore even if high dispersion glass and low dispersion glass are combined, it is difficult to compensate for chromatic aberrations in all wavelength domains. Correction of axial chromatic aberration is therefore achieved by disposing a positive lens satisfying conditional equation (7), which is preferable from the standpoint of increasing performance.

The lower limit of conditional equation (7) is preferably 0.013 and more preferably 0.0135.

The upper limit of conditional equation (7) is preferably 0.080 and more preferably 0.060.

To better correct for chromatic aberration, it is preferable for the first lens group to have two positive lenses with a positive refractive power, and more preferable for the positive lenses to satisfy conditional equation (7).

If we assign glass refractive indices Ng, NF, Nd, and NC to the g line (435.84 nm), F line (486.13 nm), d line (587.56 nm) and C line (656.27 nm), respectively, the Abbe number (vd) and partial dispersion ratio (PgF) can be expressed as follows.

$$vd=(Nd-1)/(NF-NC)$$

$$PgF=(Ng-NF)/(NF-NC)$$

Also, the glass material C7 coordinate and glass material F2 coordinate refer to coordinates in a coordinate system in which the partial dispersion ratio is the vertical axis and the Abbe number vd is the horizontal axis relative to the d line.

In an imaging lens according to an embodiment of the invention, the third lens group preferably has lenses with at least one lens with positive refractive power and lenses with at least one lens with negative refractive power. This condition determines the constitution of the third lens group. The third lens group favorably corrects aberrations such as distortion and astigmatism using lenses with at least one lens with positive refractive power and lenses with at least one lens with negative refractive power, and is preferable from the standpoint of improved performance.

To more favorably correct aberrations such as distortion and astigmatism, the third lens group more preferably has two or more negative lenses.

In imaging lenses according to an embodiment of the invention, the lens in the third lens group disposed closest toward the object side has a negative refractive power. Such a constitution enables a favorable correction of aberrations arising in lens groups with positive refractive power and disposed further to the object side than the third lens group, and is therefore preferable from the standpoint of improved performance.

In an imaging lens according to an embodiment of the invention, the interval between the first lens group and third lens group when focused at a point at infinity is preferably smaller than the total length of the first lens group. With this constitution, the lens group gap is appropriate, and the size of the imaging lens can be reduced.

In an image capturing lens according to an embodiment of the invention, the second lens group is preferably formed of a single lens component with no air spacing. A single lens component with no air spacing refers to a simple lens, a cemented lens, or a compound aspherical lens. Having this constitution allows growth in size of the focusing drive mechanism to be constrained, and enables reductions in the size of the image capturing lens.

An embodiment of the invention is preferably an imaging device comprising an imaging lens and an image capture element, disposed on the image side of the imaging lens, for converting the optical image formed by the imaging lens into an electrical signal. Here there is no particular limitation as to the image capture element; a CCD or CMOS sensor or other solid state image capture element may also be used. An imaging device using these solid state imaging elements, such as a digital camera or video camera, is shown as an example of an imaging device according to an embodiment of the invention. Also, the imaging device may of course be a fixed-lens type of imaging device in which lenses are affixed to a body, or an imaging device with interchangeable lenses, such as a single lens reflex camera or mirrorless single lens camera.

DESCRPTION OF THE PREFERRED EMBODIMENTS

We explain embodiments of the invention based on number tables and diagrams.

In the specification table with numerical values, f indicates the focal distance (mm) of the entire system, Fno indicates F number, ω indicates half view angle (°), Y indicates the maximum image height (mm), TL indicates total optical length (distance from the surface closest to the object side, to the imaging plane) (mm). In the surface data, r is the curvature radius (mm), S is the aperture diaphragm, d is the lens thickness (mm) or lens spacing (mm), Nd is the refractive index of the d line, vd is the Abbe number of the d line reference, ΔPgF is the deviation from a reference line for the partial dispersion ratio of C7 and F2, and the partial dispersion ratio when a straight line passing through a vd coordinate is assumed to be the reference line, and H indicates the effective optical radius (mm). In variable spacing, the image capture distance (mm) indicates the distance from an object to the surface in an image capturing lens closest to the object side. INF indicates infinity.

In lens configuration diagrams 1, 3, 5, 7, and 9 showing lens configurations, the imaging lens has a first lens group G1, a second lens group G2, and a third lens group G3; it forms an image on the imaging surface IMG, and has an aperture diaphragm S. F indicates the direction of focusing; in the diagram the left side is shown as the object side.

In each vertical aberration diagram 2, 4, 6, 8, and 10, spherical aberration (SA (mm)), astigmatism (AST (mm)), and distortion (DIS (%)) are shown in order starting on the left.

In the spherical aberration diagram, the vertical axis indicates the F number (shown by FNO in the figure); the solid line shows the d line, the short dashed line shows the g line, and the long dash line shows the C line.

In the astigmatism diagram, the vertical axis shows the image height (shown by Y in the figure); the solid line is the sagittal plane, and the dotted line shows characteristics of the meridional plane.

In the distortion diagram, the vertical line is the image height (shown by Y in the figure).

Embodiment 1

Figure 1:
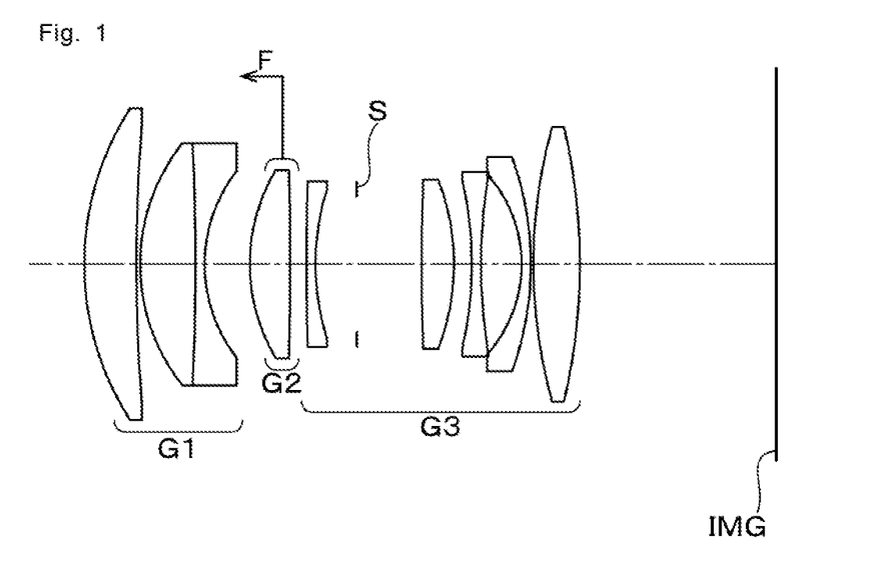
FIG. 1 is a lens configuration diagram for a first embodiment imaging lens of the present invention.
Figure 2:
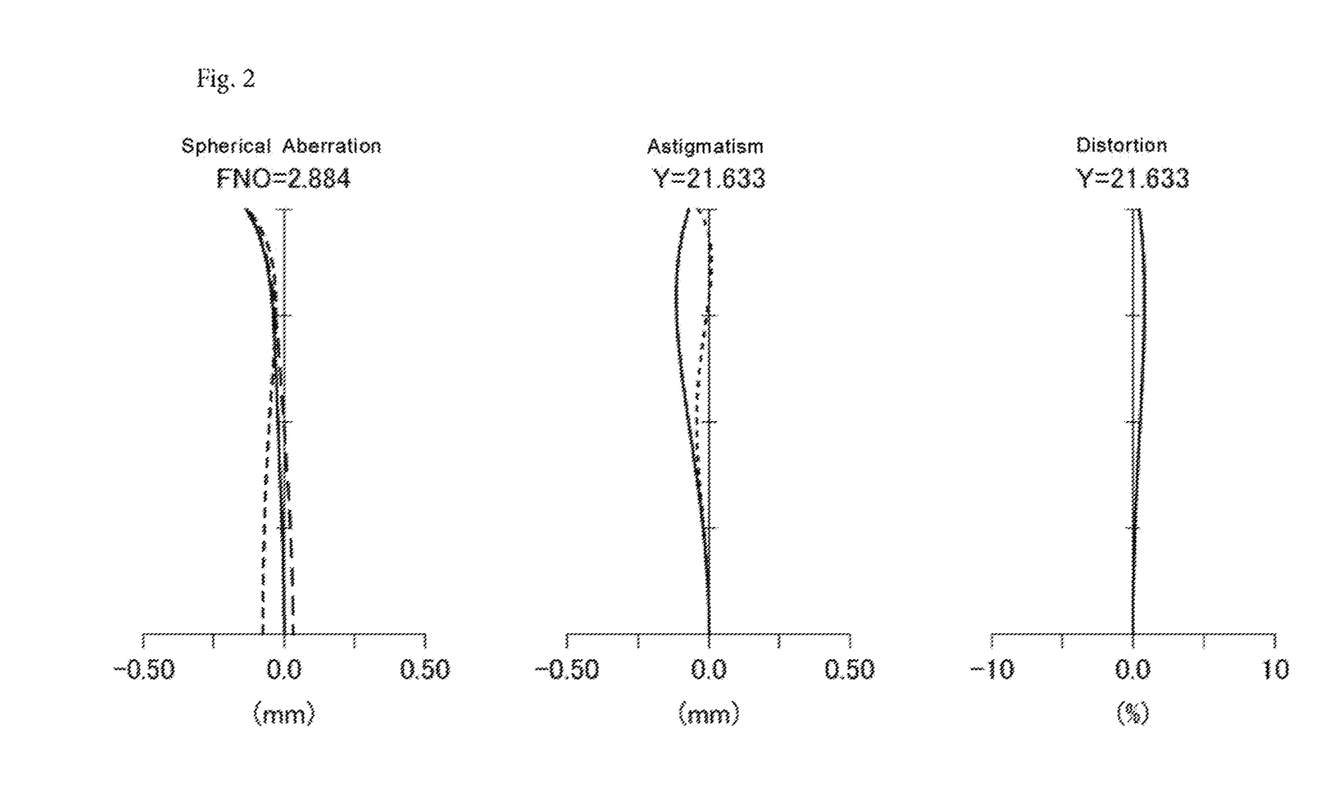
FIG. 2 is aberration diagrams for a first embodiment imaging lens of the present invention.

FIG. 1 is a cross section showing a lens configuration when an imaging lens according to a first embodiment of the invention is when focused at a point at infinity. The imaging lens comprises, in sequence starting from the object side, a first lens group G1 having a positive refractive power, a second lens group G2 having a positive refractive power, and a third lens group G3 having a negative refractive power. The aperture diaphragm S, which determines the imaging lens F number, is disposed within the third lens group G3.

The first lens group G1 comprises, in sequence from the object side, a positive meniscus lens with a convex shape to the object side, and a cemented lens made up of a biconvex lens and a biconcave lens.

The second lens group G2 is made up of biconvex lens.

The third lens group G3 comprises, in sequence from the object side, a negative meniscus lens with a concave shape on the image side, an aperture diaphragm S, a biconvex lens, a biconcave lens, a negative meniscus lens with a concave shape on the object side, and a biconvex lens.

In the imaging lens, the first lens group G1 and third lens group G3 are fixed in the optical axis direction, and focusing is performed from a point at infinity to an object at the near point by moving the second lens group G2 along the optical axis toward the object side.

Specification Table

| | |
|---|---|
| f | 82.451 |
| Fno | 2.884 |
| ω | 14.655 |
| Y | 21.633 |
| TL | 76.000 |

Surface Data

| Surface No. | r | d | Nd | vd | ΔPgF | H |
|---|---|---|---|---|---|---|
| 1 | 31.693 | 5.728 | 1.84666 | 23.78 | 0.0137 | 16.000 |
| 2 | 197.291 | 0.398 | | | | 15.200 |
| 3 | 21.405 | 6.088 | 1.49700 | 81.61 | 0.0375 | 12.300 |
| 4 | −291.220 | 1.000 | 1.85478 | 24.80 | | 11.400 |
| 5 | 16.733 | D5 | | | | 9.800 |
| 6 | 20.239 | 4.416 | 1.49700 | 81.61 | | 9.500 |
| 7 | −509.327 | D7 | | | | 9.000 |
| 8 | 325.013 | 1.000 | 1.85478 | 24.80 | | 8.300 |
| 9 | 27.486 | 4.548 | | | | 7.900 |
| 10S | INF | 7.124 | | | | 7.505 |
| 11 | 308.154 | 3.526 | 1.85478 | 24.80 | | 8.100 |
| 12 | −25.988 | 1.969 | | | | 8.500 |
| 13 | −41.452 | 1.000 | 1.51680 | 64.20 | | 8.900 |
| 14 | 59.331 | 4.482 | | | | 9.300 |
| 15 | −14.770 | 1.000 | 1.72916 | 54.67 | | 9.400 |
| 16 | −34.465 | 0.300 | | | | 10.900 |
| 17 | 57.180 | 5.094 | 1.51680 | 64.20 | | 13.400 |
| 18 | −65.667 | 21.534 | | | | 14.000 |

Variable Spacing

| Imaging Distance | INF | 854.909 |
|---|---|---|
| D5 | 4.978 | 2.747 |
| D7 | 1.816 | 4.047 |

Focal Length of Each Lens Group

| Lens Group | Surface No. | Focal Length |
|---|---|---|
| G1 | 1-5 | 145.458 |
| G2 | 6-7 | 39.275 |
| G3 | 8-18 | −48.909 |

Embodiment 2

Figure 3:
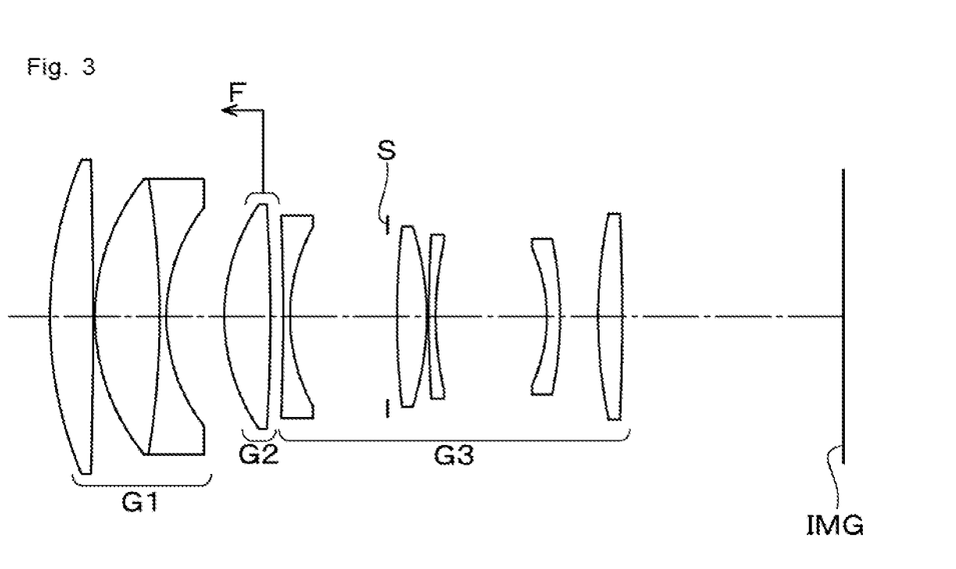
FIG. 3 is a lens configuration diagram for a second embodiment imaging lens of the present invention.
Figure 4:
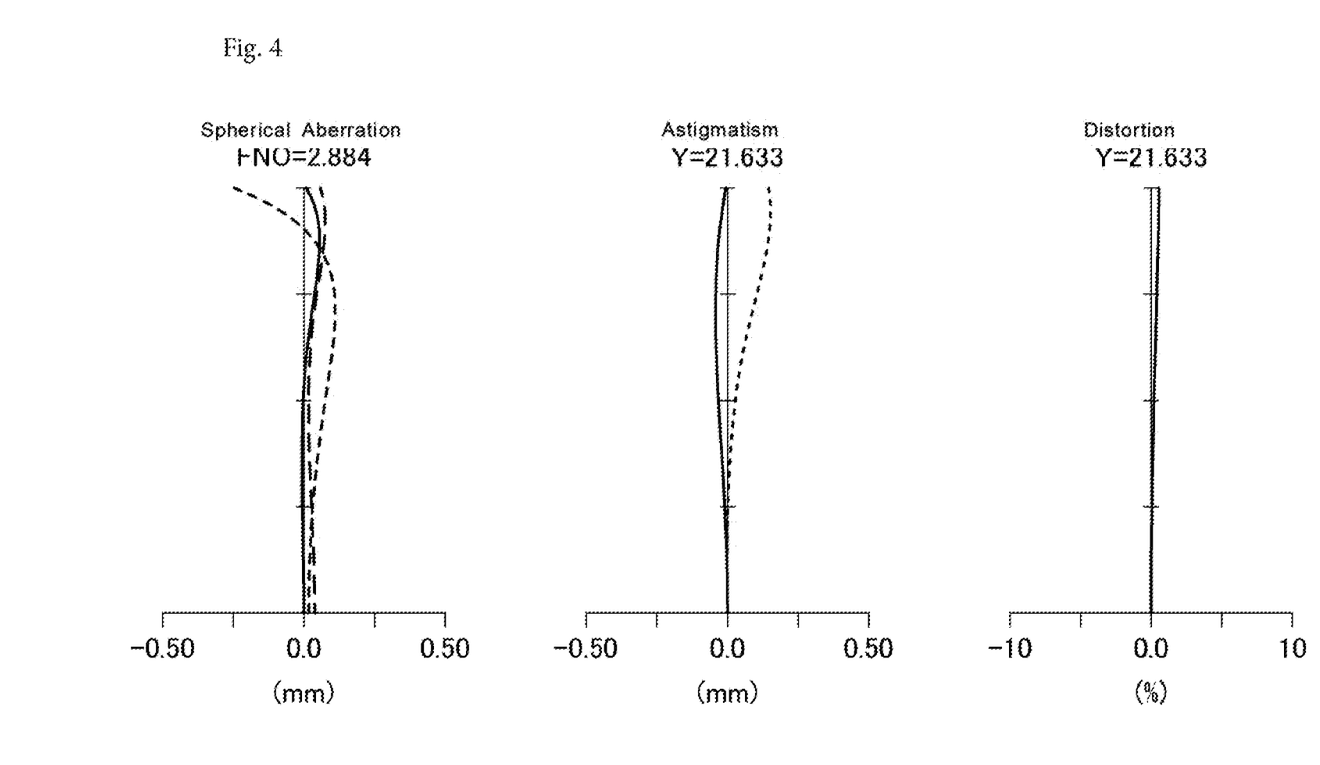
FIG. 4 is aberration diagrams fora second embodiment imaging lens of the present invention.

FIG. 3 is a cross section showing a lens configuration when an imaging lens according to a second embodiment of the invention is when focused at a point at infinity. The imaging lens is constituted, in sequence starting from the object side, of a first lens group G1 having a positive refractive power, a second lens group G2 having a positive refractive power, and a third lens group G3 having a negative refractive power. The aperture diaphragm S, which determines the imaging lens F number, is disposed within the third lens group G3.

The first lens group G1 comprises, in sequence from the object side, a cemented lens made up of a biconvex lens and a biconcave lens.

The second lens group G2 is made up of biconvex lens.

The third lens group G3 comprises, in sequence from the object side, a biconcave lens, an aperture diaphragm S, a biconvex lens, a negative meniscus lens with a concave shape on the image side, and a biconvex lens.

In the imaging lens, the first lens group G1 and third lens group G3 are fixed in the optical axis direction, and focusing is performed from a point at infinity to an object at the near point by moving the second lens group G2 along the optical axis toward the object side.

Specification Table

| | |
|---|---|
| f | 124.905 |
| Fno | 2.884 |
| ω | 9.765 |
| Y | 21.633 |
| TL | 116.301 |

Surface Data

| Surface No. | r | d | Nd | vd | ΔPgF | H |
|---|---|---|---|---|---|---|
| 1 | 59.935 | 6.296 | 1.84666 | 23.78 | 0.0137 | 21.700 |
| 2 | −925.860 | 0.300 | | | | 21.400 |
| 3 | 31.980 | 9.463 | 1.49700 | 81.61 | 0.0375 | 18.900 |
| 4 | −126.259 | 1.000 | 1.85478 | 24.80 | | 18.000 |
| 5 | 26.208 | D5 | | | | 15.600 |
| 6 | 29.318 | 6.757 | 1.72916 | 54.67 | | 15.400 |
| 7 | −266.015 | D7 | | | | 14.900 |
| 8 | −312.891 | 1.000 | 1.83400 | 37.35 | | 13.800 |
| 9 | 27.536 | 14.255 | | | | 12.700 |
| 10S | INF | 1.424 | | | | 12.249 |
| 11 | 115.105 | 4.373 | 1.84666 | 23.78 | | 12.200 |
| 12 | −42.874 | 0.300 | | | | 12.100 |
| 13 | 210.096 | 1.000 | 1.83481 | 42.72 | | 11.100 |
| 14 | 49.131 | 16.293 | | | | 10.600 |
| 15 | −24.308 | 1.934 | 1.84666 | 23.78 | | 9.600 |
| 16 | −55.603 | 5.591 | | | | 10.500 |
| 17 | 74.835 | 3.505 | 1.64769 | 33.84 | | 13.700 |
| 18 | −396.523 | 32.434 | | | | 14.000 |

Variable Spacing

| Imaging Distance | INF | 1277.480 |
|---|---|---|
| D5 | 8.484 | 6.967 |
| D7 | 1.891 | 3.409 |

Focal Length of Each Lens Group

| Lens Group | Surface No. | Focal Length |
|---|---|---|
| G1 | 1-5 | 304.743 |
| G2 | 6-7 | 36.569 |
| G3 | 8-18 | −43.966 |

[0073]

Embodiment 3

Figure 5:
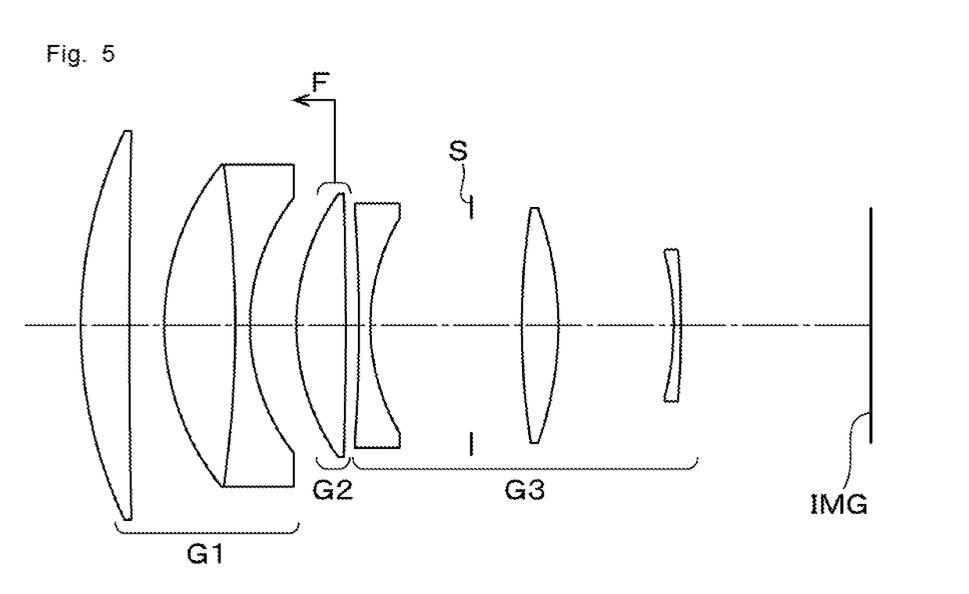
FIG. 5 is a lens configuration diagram for a third embodiment imaging lens of the present invention.
Figure 6:
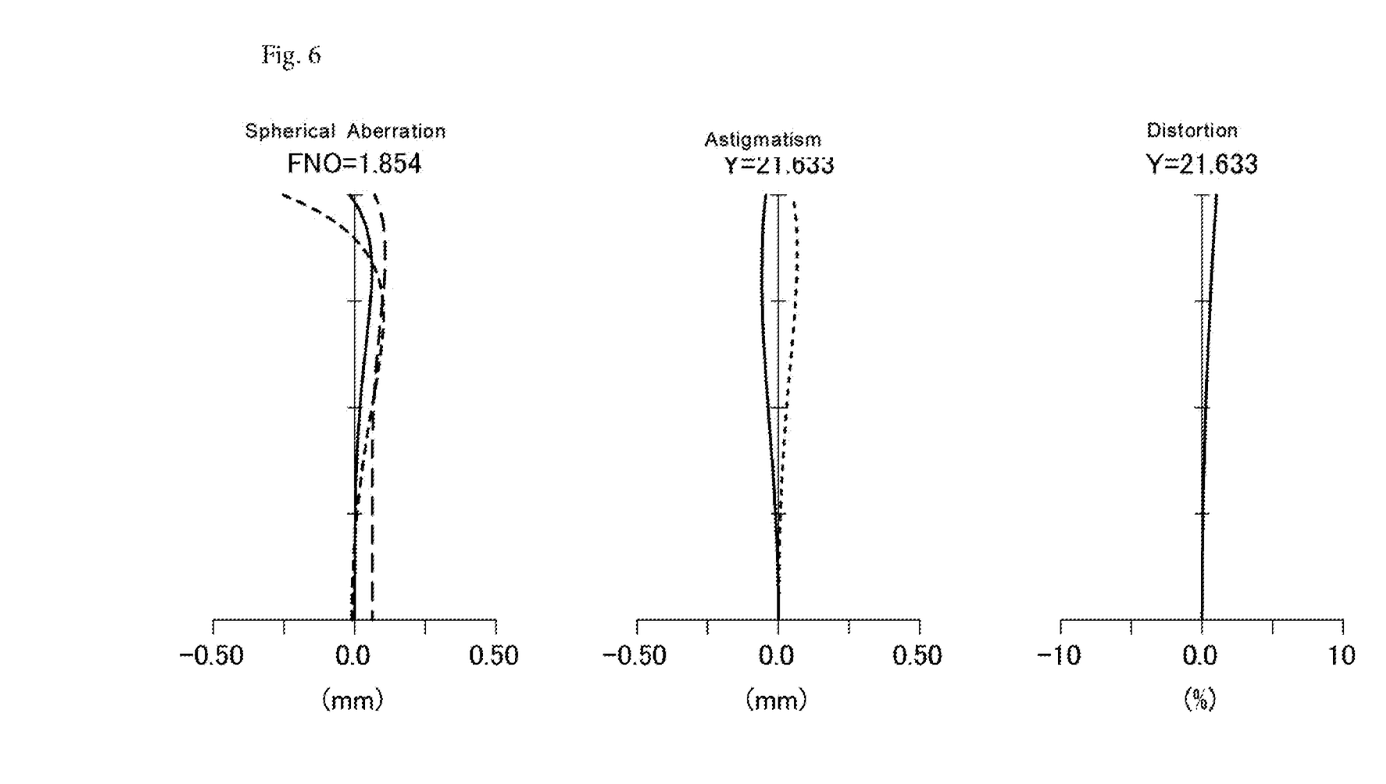
FIG. 6 is aberration diagrams for a third embodiment imaging lens of the present invention.

FIG. 5 is a cross section showing a lens configuration when an imaging lens according to a third embodiment of the invention is when focused at a point at infinity. The imaging lens is constituted, in sequence starting from the object side, of a first lens group G1 having a positive refractive power, a second lens group G2 having a positive refractive power, and a third lens group G3 having a negative refractive power. The aperture diaphragm S, which determines the image capturing lens F number, is disposed within the third lens group G3.

The first lens group G1 comprises, in sequence from the object side, a positive meniscus lens projecting to the object side, and a cemented lens made up of a biconvex lens and a biconcave lens.

The second lens group G2 is made up of biconvex lens.

The third lens group G3 comprises, in sequence from the object side, a biconcave lens, an aperture diaphragm S, a biconvex lens, and a negative meniscus lens with a concave shape on the object side.

In the imaging lens, the first lens group G1 and third lens group G3 are fixed in the optical axis direction, and focusing is performed from a point at infinity to an object at the near point by moving the second lens group G2 along the optical axis toward the object side.

Embodiment 4

| Specification Table | |
|---|---|
| f | 125.920 |
| Fno | 1.854 |
| ω | 9.646 |
| Y | 21.633 |
| TL | 144.837 |

| Surface Data | | | | | | |
|---|---|---|---|---|---|---|
| Surface No. | r | d | Nd | vd | ΔPgF | H |
| 1 | 83.194 | 8.884 | 1.84666 | 23.78 | 0.0137 | 34.000 |
| 2 | 1523.994 | 6.414 | | | | 33.600 |
| 3 | 46.967 | 13.028 | 1.49700 | 81.61 | 0.0375 | 28.000 |
| 4 | −205.070 | 2.702 | 1.85478 | 24.80 | | 27.100 |
| 5 | 38.316 | D5 | | | | 23.000 |
| 6 | 41.665 | 9.008 | 1.72916 | 54.67 | | 22.800 |
| 7 | −903.566 | D7 | | | | 22.200 |
| 8 | −318.152 | 2.107 | 1.85883 | 30.00 | | 21.100 |
| 9 | 39.118 | 18.497 | | | | 19.300 |
| 10S | INF | 9.254 | | | | 19.769 |
| 11 | 138.564 | 6.703 | 1.85883 | 30.00 | | 20.200 |
| 12 | −64.449 | 21.202 | | | | 20.200 |
| 13 | −52.467 | 1.282 | 1.80610 | 33.27 | | 12.500 |
| 14 | −181.546 | 34.799 | | | | 12.900 |

| Variable Spacing | | |
|---|---|---|
| Imaging Distance | INF | 1307.186 |
| D5 | 8.519 | 4.838 |
| D7 | 2.438 | 6.119 |

| Focal Length of Each Lens Group | | |
|---|---|---|
| Lens Group | Surface No. | Focal Length |
| G1 | 1-5 | 446.804 |
| G2 | 6-7 | 54.843 |
| G3 | 8-14 | −125.723 |

Figure 7:
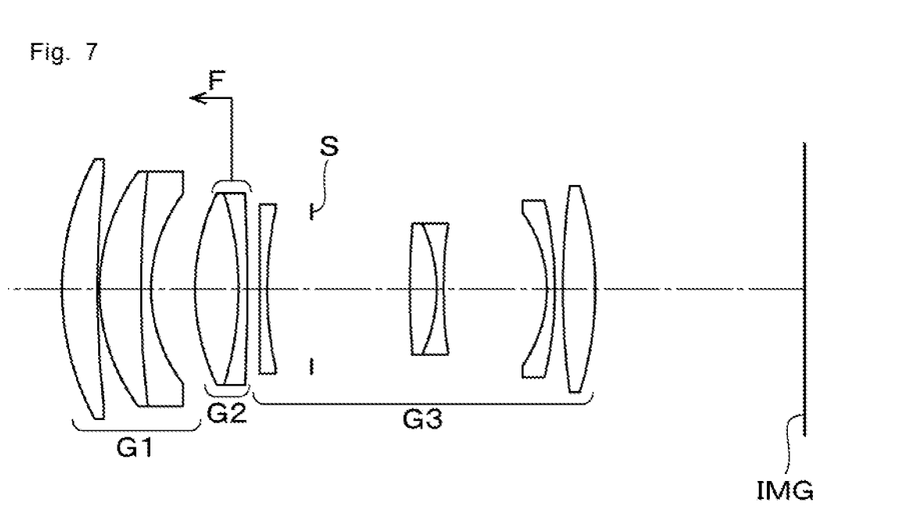
FIG. 7 is a lens configuration diagram fora fourth embodiment imaging lens of the present invention.
Figure 8:
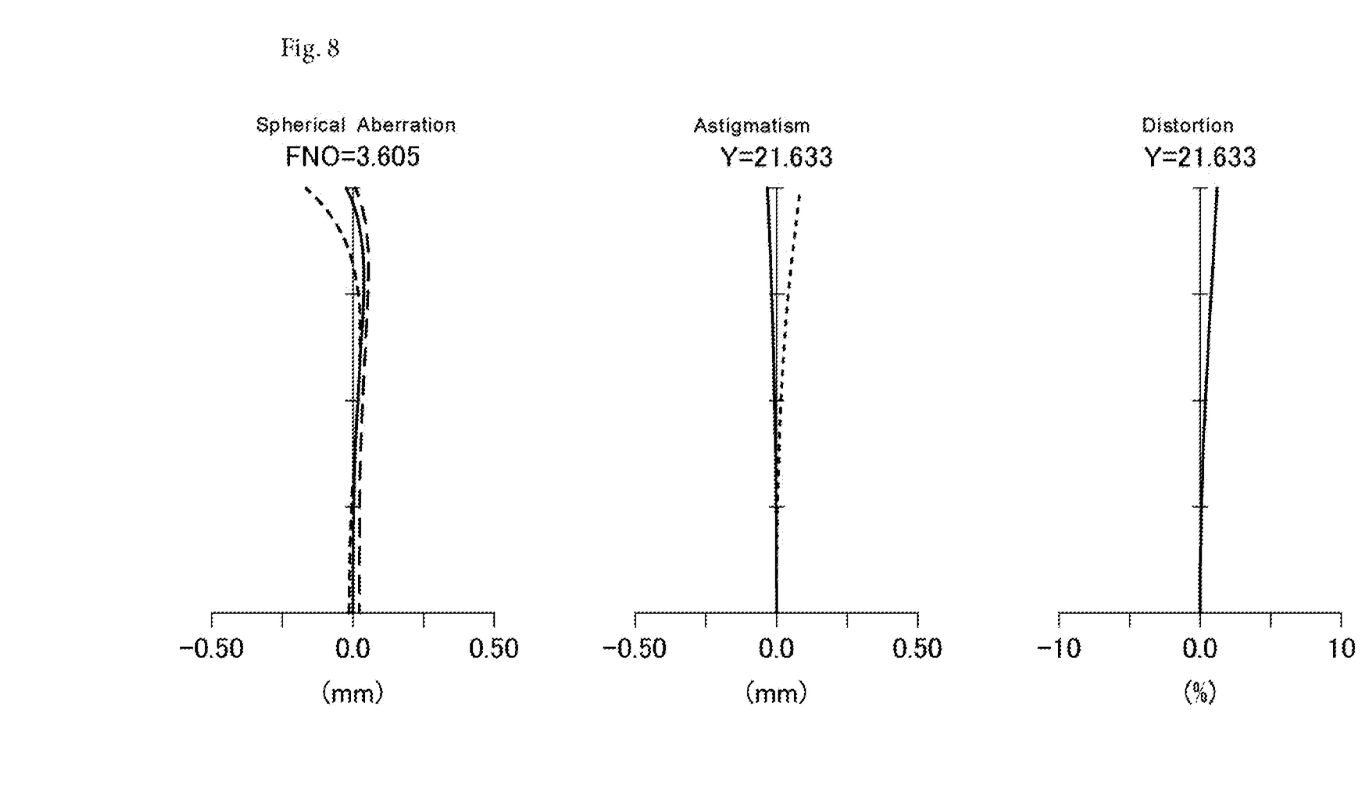
FIG. 8 is aberration diagrams for a fourth embodiment imaging lens of the present invention.

FIG. 7 is a cross section showing a lens configuration when an imaging lens according to a fourth embodiment of the invention is when focused at a point at infinity. The imaging lens is constituted, in sequence starting from the object side, of a first lens group G1 having a positive refractive power, a second lens group G2 having a positive refractive power, and a third lens group G3 having a negative refractive power. The aperture diaphragm S, which determines the imaging lens F number, is disposed within the third lens group G3.

The first lens group G1 comprises, in sequence from the object side, a convex positive meniscus lens, and a cemented lens made up of a positive meniscus lens convex on the object side and a negative meniscus lens with a concave shape on the image side.

The second lens group G2 comprises a biconvex lens and a negative meniscus lens with a concave shape on the object side.

The third lens group G3 comprises, in sequence from the object side, a biconcave lens, an aperture diaphragm S, a cemented lens [made up of] a biconvex lens and a biconcave lens, a negative meniscus lens with a concave shape on the object side, and a biconvex lens.

In the imaging lens, the first lens group G1 and third lens group G3 are fixed in the optical axis direction, and focusing is performed from a point at infinity to an object at the near point by moving the second lens group G2 along the optical axis toward the object side.

Embodiment 5

| Specification Table | |
|---|---|
| f | 128.082 |
| Fno | 3.605 |
| ω | 9.474 |
| Y | 21.633 |
| TL | 108.872 |

| Surface Data | | | | | | |
|---|---|---|---|---|---|---|
| Surface No. | r | d | Nd | vd | ΔPgF | H |
| 1 | 40.190 | 5.198 | 1.84666 | 23.78 | 0.0137 | 17.800 |
| 2 | 156.551 | 0.300 | | | | 17.400 |
| 3 | 28.770 | 6.060 | 1.49700 | 81.61 | 0.0375 | 16.000 |
| 4 | 144.391 | 1.507 | 1.85478 | 24.80 | | 15.200 |
| 5 | 23.089 | D5 | | | | 13.400 |
| 6 | 32.425 | 6.403 | 1.49700 | 81.61 | | 13.000 |
| 7 | −46.560 | 1.251 | 1.56732 | 42.84 | | 12.600 |
| 8 | −343.279 | D8 | | | | 12.100 |
| 9 | −7457.701 | 1.140 | 1.80610 | 33.27 | | 11.500 |
| 10 | 56.080 | 6.528 | | | | 11.100 |
| 11S | INF | 14.427 | | | | 10.300 |
| 12 | 150.900 | 3.874 | 1.72047 | 34.71 | | 8.300 |
| 13 | −22.839 | 1.000 | 1.51680 | 64.20 | | 8.600 |
| 14 | 66.523 | 15.153 | | | | 8.800 |
| 15 | −19.546 | 1.185 | 1.72916 | 54.67 | | 10.800 |
| 16 | −55.459 | 1.190 | | | | 11.900 |
| 17 | 115.254 | 4.725 | 1.51680 | 64.20 | | 13.500 |
| 18 | −51.434 | 30.710 | | | | 14.000 |

| Variable Spacing | | |
|---|---|---|
| Imaging Distance | INF | 1325.026 |
| D5 | 6.422 | 3.438 |
| D8 | 1.798 | 4.782 |

| Focal Length of Each Lens Group | | |
|---|---|---|
| Lens Group | Surface No. | Focal Length |
| G1 | 1-5 | 187.263 |
| G2 | 6-8 | 64.758 |
| G3 | 9-18 | −57.093 |

Figure 9:
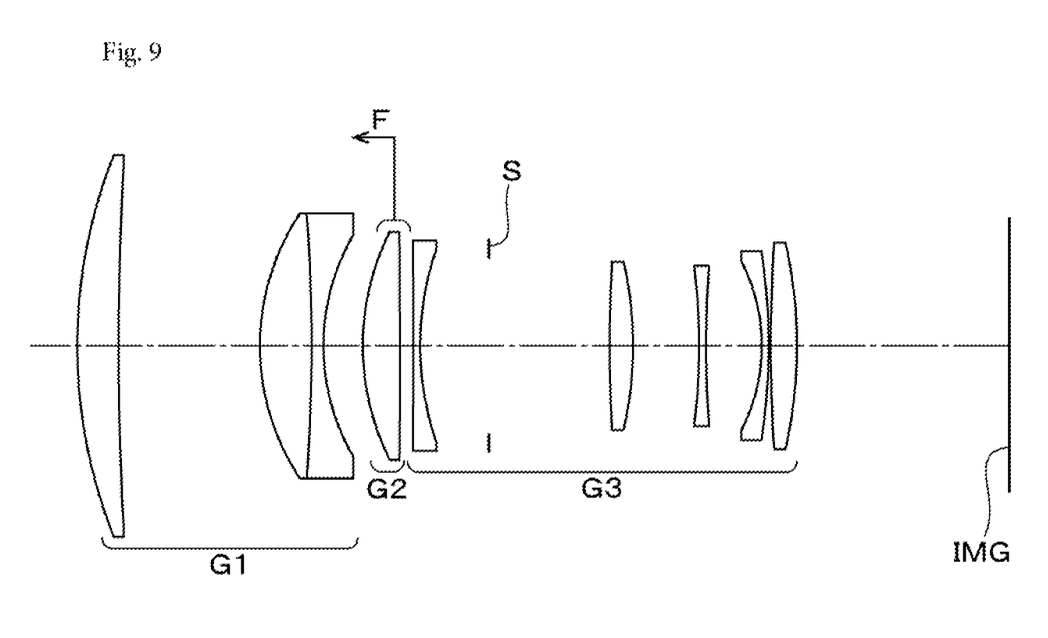
FIG. 9 is a lens configuration diagram for a fifth embodiment imaging lens of the present invention.
Figure 10:
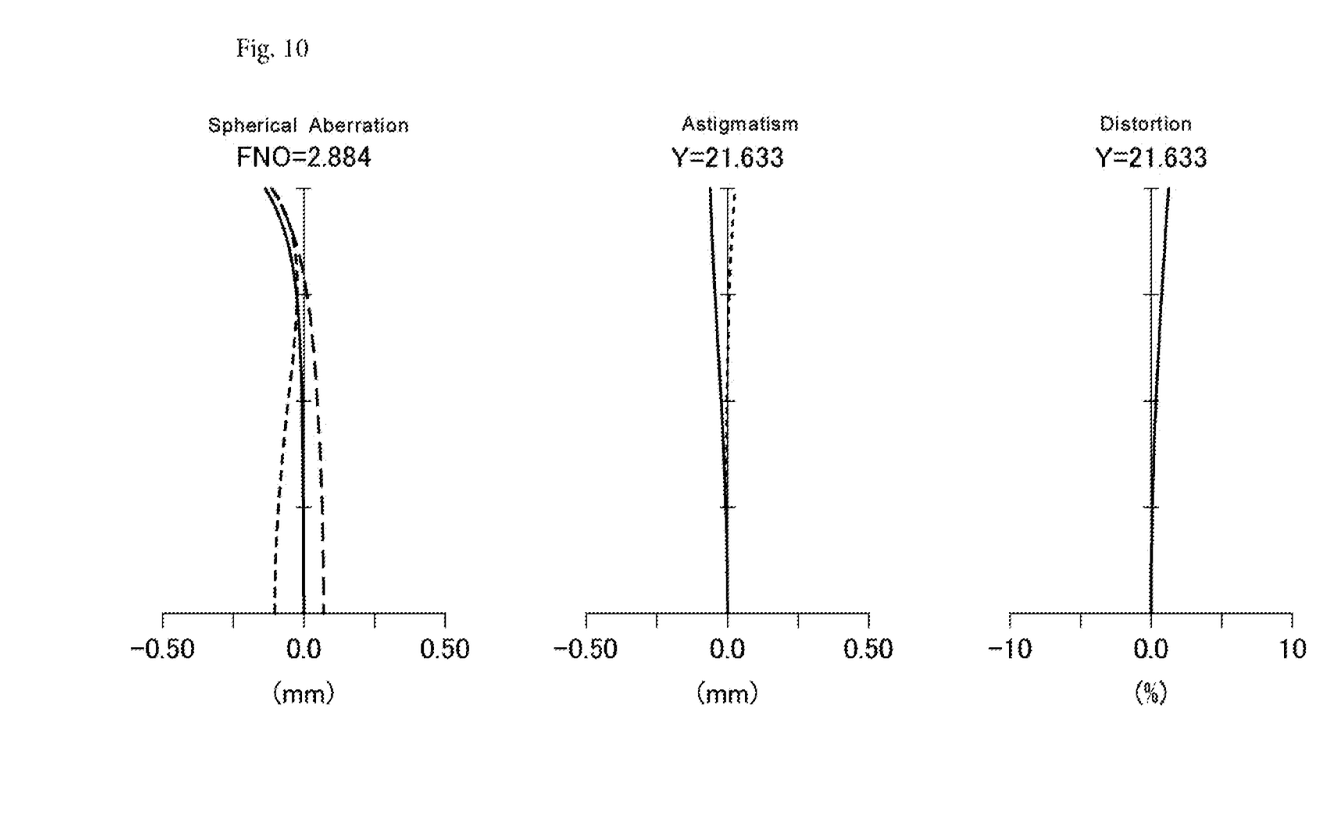
FIG. 10 is aberration diagrams for a fifth embodiment imaging lens of the present invention.

FIG. 9 is a cross section showing a lens configuration when an imaging lens according to a fifth embodiment of the invention is when focused at a point at infinity. The imaging lens is constituted, in sequence starting from the object side, of a first lens group G1 having a positive refractive power, a second lens group G2 having a positive refractive power, and a third lens group G3 having a negative refractive power. The aperture diaphragm S, which determines the image capturing lens F number, is disposed within the third lens group G3.

The first lens group G1 comprises, in sequence from the object side, a positive meniscus lens projecting to the object side, and a cemented lens made up of a biconvex lens and a biconcave lens.

The second lens group G2 is made up of biconvex lens[es].

The third lens group G3 comprises, in sequence from the object side, a biconcave lens, an aperture diaphragm S, a biconvex lens, a biconcave lens, a negative meniscus lens with a concave shape on the object side, and a biconvex lens.

In the imaging lens, the first lens group G1 and third lens group G3 are fixed in the optical axis direction, and focusing is performed from a point at infinity to an object at the near point by moving the second lens group G2 along the optical axis toward the object side.

Specification Table

| | |
|---|---|
| f | 143.416 |
| Fno | 2.884 |
| ω | 8.481 |
| Y | 21.633 |
| TL | 136.846 |

Surface Data

| Surface No. | r | d | Nd | vd | ΔPgF | H |
|---|---|---|---|---|---|---|
| 1 | 75.771 | 6.069 | 1.84666 | 23.78 | 0.0137 | 26.500 |
| 2 | 492.498 | 20.673 | | | | 26.000 |
| 3 | 35.025 | 7.641 | 1.49700 | 81.61 | 0.0375 | 18.200 |
| 4 | −267.483 | 1.745 | 1.85478 | 24.80 | | 17.500 |
| 5 | 32.196 | D5 | | | | 15.700 |
| 6 | 37.341 | 5.426 | 1.72916 | 54.67 | | 15.500 |
| 7 | −1774.625 | D7 | | | | 15.100 |
| 8 | −1990.341 | 1.000 | 1.84666 | 23.78 | | 14.300 |
| 9 | 43.578 | 10.096 | | | | 13.700 |
| 10S | INF | 17.719 | | | | 12.930 |
| 11 | 235.202 | 3.418 | 1.84666 | 23.78 | | 11.400 |
| 12 | −55.114 | 9.714 | | | | 11.200 |
| 13 | −88.925 | 1.000 | 1.72916 | 54.67 | | 10.600 |
| 14 | 155.484 | 8.186 | | | | 10.800 |
| 15 | −27.002 | 1.000 | 1.72916 | 54.67 | | 11.900 |
| 16 | −89.394 | 0.300 | | | | 12.800 |
| 17 | 225.590 | 3.864 | 1.72825 | 28.32 | | 13.600 |
| 18 | −67.719 | 31.201 | | | | 14.000 |

Variable Spacing

| Imaging Distance | INF | 1474.110 |
|---|---|---|
| D5 | 5.806 | 2.655 |
| D7 | 1.988 | 5.139 |

Focal Length of Each Lens Group

| Lens Group | Surface No. | Focal Length |
|---|---|---|
| G1 | 1-5 | 415.098 |
| G2 | 6-7 | 50.219 |
| G3 | 8-18 | −66.276 |

Figure 11:
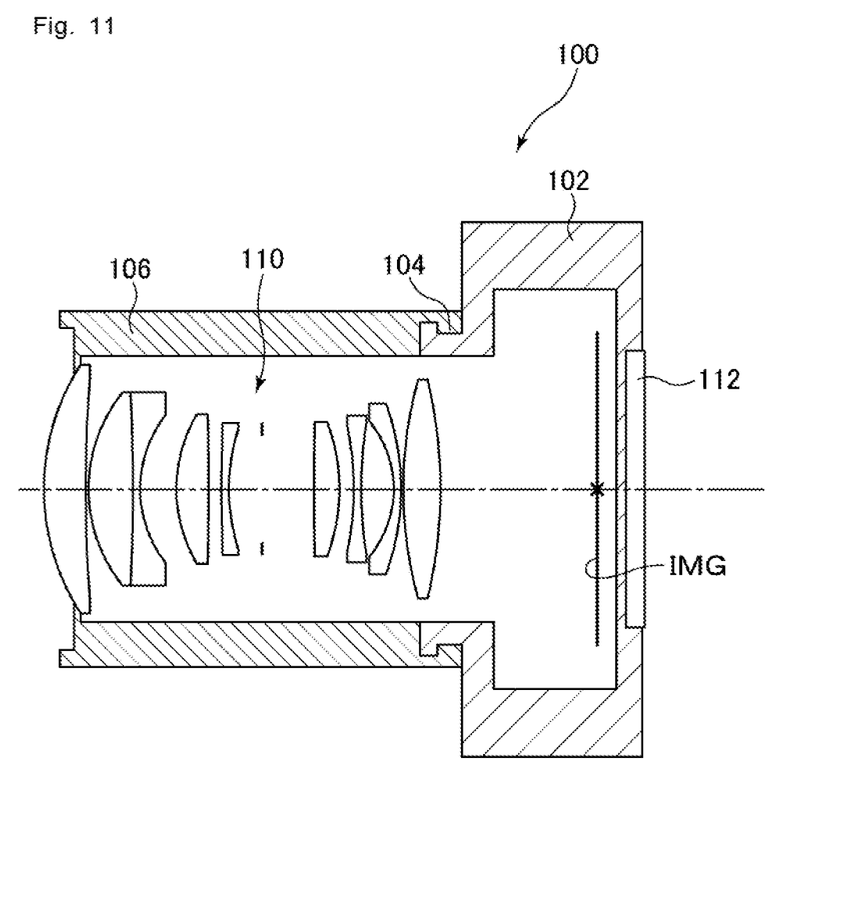
FIG. 11 is an explanatory diagram of the configuration of an imaging device in an embodiment of the invention.

In an imaging device embodiment 100, as shown in FIG. 11, an imaging lens 110 is supported by a lens barrel 106, which is inserted into an imaging device housing 102 by a lens mount 104. The image of a subject is formed on imaging surface IMG by the imaging lens 110, and the image is displayed on a display 112.

Conditional Equation Numerical Correspondence

| | 1st Emb. | 2nd Emb. | 3rd Emb. | 4th Emb. | 5th Emb |
|---|---|---|---|---|---|
| (1) $(1-b2^2) \times b3^2$ | 3.586 | 7.975 | 3.299 | 4.170 | 4.479 |
| (2) L1/TL | 0.174 | 0.147 | 0.214 | 0.120 | 0.264 |
| (3) f2/f1 | 0.270 | 0.120 | 0.123 | 0.346 | 0.121 |
| (4) |f3|/f12 | 1.173 | 1.004 | 1.835 | 0.960 | 0.991 |
| (5) TL/FL | 0.922 | 0.931 | 1.150 | 0.850 | 0.954 |
| (6) FL/Y | 3.811 | 5.774 | 5.821 | 5.921 | 6.629 |

What is claimed is:

1. An imaging lens comprising a first lens group having a positive refractive power, a second lens group having a positive refractive power, and a third lens group having a negative refractive power, disposed in sequence from the object side, wherein focusing from a point at infinity state to an object at the near point is performed by moving the second lens group along an optical axis toward the object side while fixing the first lens group and third lens group, and the following conditional expressions shown below are satisfied $$3.0 \leq (1-b2^2) \times b3^2 \leq 10.0 \quad (1)$$

$$0.10 \leq L1/TL \leq 0.30 \quad (2)$$

where:
b2: lateral magnification of the second lens group focused at a point in infinity
b3: lateral magnification of the third lens group focused at a point in infinity
L1: total length of the first lens group
TL: total optical length of the imaging lens, and
the first lens group has at least one positive lens with positive refractive power, and the positive lens satisfies the following conditional expression $$0.012 \leq \Delta PgF1 \leq 0.100 \quad (7)$$

where:
ΔPgF1: deviation of a partial dispersion ratio of the positive lens from a reference line, the reference line being a straight line passing coordinates of partial dispersion ratio values and vd values of C7, which have a partial dispersion ration of 0.5393 and vd of 60.49 and F2, which have a partial dispersion ratio of 0.5829 and vd of 36.30.

2. The imaging lens of claim 1, wherein the following conditional expression is satisfied $$0.10 \leq f2/f1 \leq 0.50 \quad (3)$$

where:
f1: focal length of the first lens group
f2: focal length of the second lens group.

3. The imaging lens of claim 1 wherein the following conditional expression is satisfied $$0.8 \leq |f3|/f12 \leq 2.2 \quad (4)$$

where:
f12: combined focal length of the first lens group and the second lens group when focused to a point at infinity
f3: focal length of the third lens group.

4. The imaging lens of claim 1, wherein the following conditional expression is satisfied $$0.50 \leq TL/FL \leq 1.20 \quad (5)$$

where:
FL: focal length of the imaging lens when focused to a point at infinity.

5. The imaging lens of claim 1, wherein the following conditional expression is satisfied $$2.0 \leq FL/Y \leq 10.0 \quad (6)$$

where:
FL: focal length of the imaging lens when focused at a point at infinity
Y: maximum image height.

6. The imaging lens of claim 1, wherein the total number of lenses making up the first lens group, the second lens group, and the third lens group is 10 or less.

7. An imaging device comprising an imaging lens set forth in claim 1, and an image capture element, disposed on the image side of the imaging lens, for converting the optical image formed by the imaging lens into an electrical signal.

* * * * *